H. F. D. SCHWAHN.
METHOD OF PREPARING ALUMINUM SULFATE.
APPLICATION FILED SEPT. 16, 1912.
1,077,309.
Patented Nov. 4, 1913.
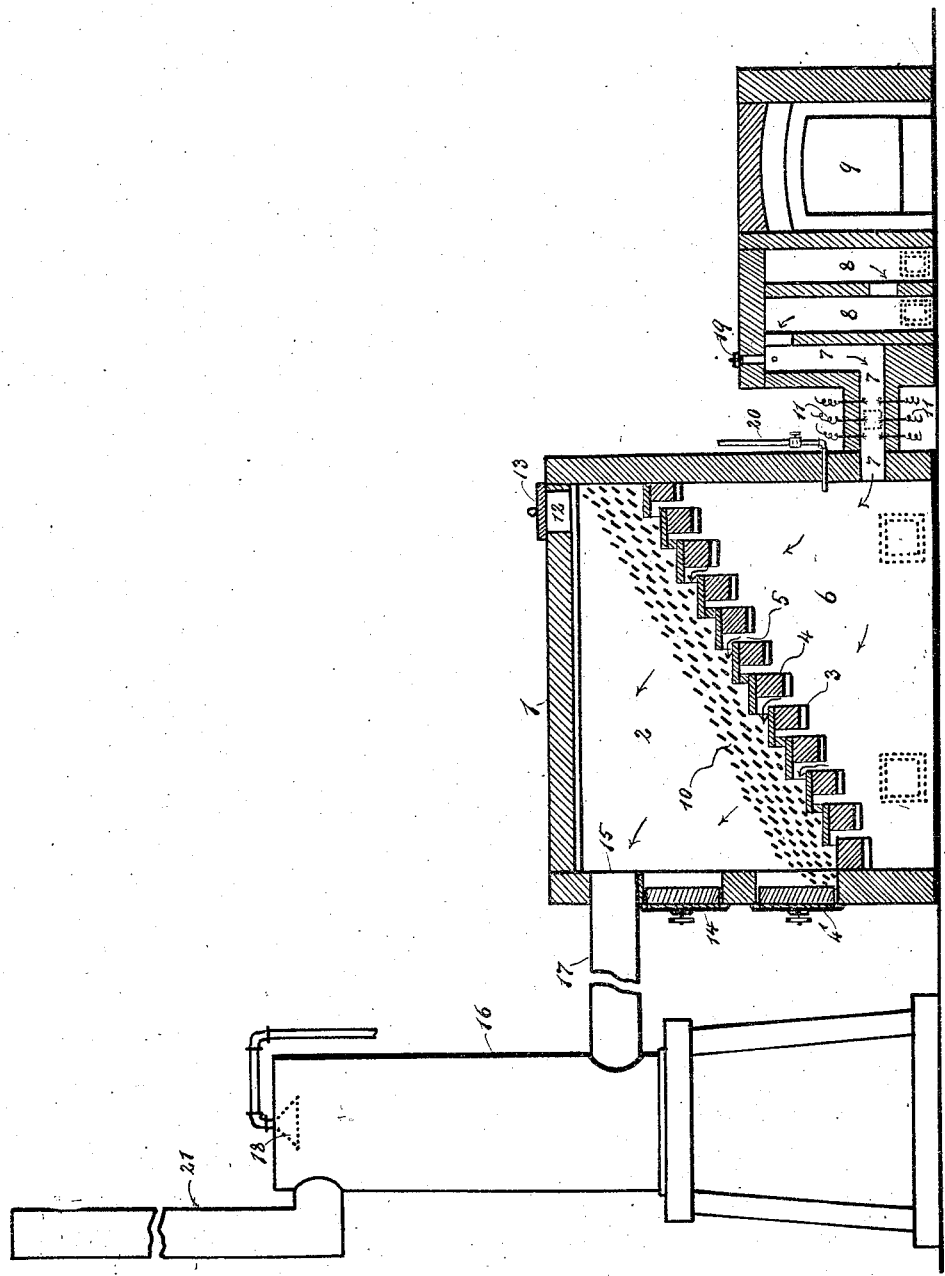
WITNESSES:
M. B. Miller.
Chas McCluskey
INVENTOR
Heinrich F. D. Schwahn.

UNITED STATES PATENT OFFICE.

HEINRICH F. D. SCHWAHN, OF BELLEVILLE, ILLINOIS.

METHOD OF PREPARING ALUMINUM SULFATE.

1,077,309.   Specification of Letters Patent.   Patented Nov. 4, 1913.

Application filed September 16, 1912. Serial No. 720,541.

*To all whom it may concern:*

Be it known that I, HEINRICH F. D. SCHWAHN, a citizen of the United States, residing at the city of Belleville, in the county of St. Clair and State of Illinois, have invented a certain new and useful Method of Preparing Aluminum Sulfate, of which the following description is so full, clear, and exact as to enable those skilled in the art to which it appertains to use the same, reference being had to the accompanying drawings, forming part of this specification, in which the figure is a vertical section, partly in elevation, showing one form of apparatus for carrying out my method.

This invention is an improved method of treating clays, shales or other aluminous materials, ores or compounds and minerals for the more economical production therefrom of aluminum sulfate and in turn aluminum.

In my Letters Patent No. 752,927, dated Febr. 23, 1904, "process of preparing aluminum sulfate," I describe and claim a process for treating clays, shales or other aluminous compounds for their purification with hydrochloric acid, and the production therefrom of aluminum sulfate with a sulfuric acid solution; and simultaneously injecting heated air into the resultant mixture of said solution and aluminous materials, and this is not herein claimed.

This process just referred to, like any other process now in vogue for the production of aluminum sulfate, requires the ready made sulfuric acid, and consequently necessitates a great outlay for an acid plant, or to secure the acid in the open market, a very expensive and uncertain source, for obvious reason.

Now, it is known that sulfurous anhydrid ($SO_2$), when brought in contact in presence of air and moisture with clays, shales or other aluminous ores, will dissolve therefrom in time the aluminum content, and produce aluminum sulfate. And I am aware that such a process was for some time heretofore practised but required too much time, about three months and more. And furthermore the product contained all the iron present in the ore, and on account of these disadvantages the process was abandoned long ago.

To overcome these difficulties above referred to and offer a cheaper and more rapid process for the production of aluminum sulfate, substantially free of iron, and in one operation, with the rapid production of sulfuric acid, is the object of this invention. And I wish to be understood here and in my claims that I mean under aluminous materials, any aluminous compound or ore, shales and clays, the silicates and hydrates or oxid of aluminum, or any other mineral or rock with an aluminum content, which always contain, as well known, more or less iron, and thereby contaminating the sulfate produced thereof; and to separate the iron therefrom completely I use ozone or ozonized air in the manner as hereinafter described, an essential feature of this improvement, and of which it forms a part.

According to this my improved method the raw ore, such as for instance kaolinite or bauxite; or calcined ores, such as for instance kaolin, or shal are powdered to pass through about 30-40 mesh screen, and I charge, after moistening it with water, to become quite wet, into a suitable container or containers more fully described below. And upon the moist pulp I charge then in any suitable way sulfurous anhydrid gas ($SO_2$), suitably resultant from burning pyrites or brimstone, in a burner as usually used in the manufacture of sulfuric acid, or secure said $SO_2$ from any other source, such as industrial operations. However, this sulfurous anhydrid gas is mixed generally with more or less air, the proportion of which can in most cases be regulated by the operator, especially so in the pyrites burners. Now, for reason that the oxygen in this air shall become more active as an oxidizing agent, or carrier for oxygen, the above mixture of gases, for an example, from said burners, is subjected to electrical discharges, in other words the air content of the burner gases is ozonized, preferably on entering the respective container or containers, to act at once in the improved condition in conjunction with the anhydrid ($SO_2$) in presence of moisture upon the pulp of the aluminous material and produce sulfates of its aluminum and iron content, which latter is transformed in turn to a basic ferric salt by the action of the ozonized oxygen of the air, and forms a yellow mud, which on dissolving and decanting or filtering the product will settle or remain with the waste pulp or residue, and produce a pure solution of aluminum sulfate.

In carrying out my method in the preferred form, I preferably use a series of containers, so as to make a continuous operation of the other parts of the plant possible, and construct them in size accordingly. And I provide these containers, each, with the usual, perforated and acid resisting false bottom upon which the pulp is charged. While the gases from the pyrites burners, naming them as an example for the source of the mixture of sulfurous anhydrid and air, is led by means of a flue into a certain loaded container, suitably under its false bottom. And said flue is provided, preferably, on or near its outlet into the container, with a number of electric terminals or brushes as usually used for ozoning air within an electric circuit, and use this means for the discharge of electrical sparks into and through the burner gases, and ozonizing its oxygen content which in turn acts then in presence of moisture upon the sulfurous anhydrid and produces sulfuric acid ($H_2SO_4$) which in its nascent condition acts then most violently on the moist pulp of aluminous material, thereby rapidly dissolving the aluminum content of the mineral with the production of sulfate of aluminum therefrom, approximately of the formula $Al_2(SO_4)_3$. Furthermore, the containers are substantially closed during operation and suitably connected from near their tops, by means of tubes or pipes with a wooden stack to create a certain draft between the container and burner, and move thereby the reagent gases more readily through the pulp, and in addition to this act as an acid tower in the usual way for the recovery of such sulfuric acid vapors which may have passed away with the waste nitrogen from the air in the burner gases.

For the better understanding of the operation of such containers with its accessories I have shown in the drawing such combination of apparatus suitable for my purposes, and in which 1 shows a preferred form of apparatus, though other types may be used, 2 represents the container of the ore with the false bottom 3, preferably arranged in form of a step by means of the arches 4, made of refractory material, and tiles covering their tops, which protrude from one step over the other horizontally, leaving by means of their supports, only partly indicated the spaces 5 as perforations or passages between said arches 4 permitting thereby the gases accumulating in chamber 6 from the canal 7, dust chamber 8 and pyrites-burner 9 respectively, to enter into the charge 10 and permeate the same for the converting of the aluminous material into a sulfate. Said canal 7 is provided with the usual induction brushes 11, which in turn are connected with an induction coil (not shown), and by means of which electrical discharges are made upon and through the passing gases from the burner 9 before entering into chamber 6, for the ozonizing of their contained oxygen. An opening 12 is provided for the charging of the ore, and this opening is normally closed by the cover or cap 13, while the doors 14, and 14' are provided for discharging of the resultant sulfate.

15 is a passage for the spent acid vapors and other gases, making connection with the acid-tower 16, by means of pipe 17. Said acid-tower may be suitably arranged by filling it with pebbles or hard coke, or arranging it otherwise in the usual way for the recovery and concentration of the spent sulfuric acid by the trickling of water or weak sulfuric acid over said coke by means of a spray 18, as usually practised.

19 is a gate provided for the charging of air into the canal 7 to mix the gases from the dust-chamber 8 or burner 9 respectively, in case a greater amount of ozone, to act upon the aluminous material, is desirable. And 20 is a steam-pipe for the charging of steam into chamber 6 to moisten the gases in case the aluminous ore was charged dry, or nearly so, as will be the case in treating plastic clays.

21 represents a pipe extending from the tower 16 to carry off the waste gases and assist in creating a draft upon the entire combination of apparatus. The dust-chamber 8 is provided for the depositing of the unburned pyrites, arsenic, antimony or zinc and iron oxid, etc., but in case of using brimstone for the source of sulfur the dust-chamber may be omitted.

In starting the apparatus for operation the same is heated suitably by means of burning fuel in the burner 9 and chamber 6, and to such an extent that watery vapors i. e., steam will not condense if cold ore is charged into the container 2, when the burning of the pyrites or brimstone, as the case may be, will then be started at once, and the heating of the apparatus discontinued. In heating the apparatus the opening 12 may answer for an outlet for the products of combustion, while no extra heating is required in a continuous operation, for reason that sufficient heat is generated from the resultant reactions to carry on the method as a continuous process.

In operating these containers according to my improved method the raw, or calcined aluminous material, is first ground, if necessary, to pass through a thirty or forty mesh screen. The resultant ground material may then be saturated with water or with some of the recovered weak acid from the towers or stacks, and is thereafter charged into the containers in a layer, from one to two feet thick, when the loaded container is closed and charged with the ozonized burner gases namely, sulfurous anhydrid and ozonized or active oxygen from the air incidentally present in said burner gases or purposely charged with the same. Soon the aluminous material will become hot and a more or less violent reaction will then take place, and the mass swells and emits steam, and the time required for the finishing of the process depends entirely on the volume of the reagent gases charged during a certain time, and the bulk of the pulp. But when the reaction ceases, the swelling of the mass will cease also and cool on removing from the container, when it is ready for the leaching out of the produced aluminum sulfate, which I preferably carry out by boiling the mass with water, while injecting ozonized oxygen or air into the boiling mass, and this has the object to connect by oxidation any ferrous sulfate present into the basic ferric salt which separates on decanting as a yellow mud, from the clear, then iron free sulfate solution, upon the waste parts of the pulp which forms a residue with other oxidized foreign matters, which have been precipitated from the solution of aluminum sulfate. And after drawing the iron free and otherwise pure solution of sulfate of aluminum from the waste or residue matter I preferably leach the same with water to recover its contained sulfate and use the resultant weak solution for another boil of crude sulfate, while the strong sulfate solution is concentrated in the usual way by evaporation to become a marketable product. But at this point or preferably at a somewhat higher concentration, if the sulfate shall be used for the manufacture of aluminum, I add some carbon containing substances, such as for instance yellow pine saw-dust, ground corn-cobs, wood-pulp or any other carbonaceous or carbon containing substance of a porous nature or apt to evolve carbon gases and combine their carbon with the sulfate on heating and form a resistance conductor to electric currents, thereby avoiding a calcination of the sulfate of aluminum for the production of the metal thereof, according to my improved process No. 964566, of July 19, 1910.

Although I have specified the application of ozonized air in combination with sulfurous anhydrid this will include also ozonized oxygen from other sources, and its use for the treatment of the aluminum sulfate solution resultant from this process for the precipitation of their contained iron permits to produce an absolute iron free sulfate from sulfate solutions containing the same, which heretofore was not possible. And the function of the ozone from oxygen or from oxygen in the air are further distinguished, however, from other oxidizing agents that it acts to accelerate the reactions in this process to a very marked degree by oxidizing, so to say, instantly the $SO_2$ to $H_2SO_4$ right upon the moist ore particles which it permeates and heats, and consequently the time required for the solution of the aluminum content is reduced to a small fraction of that heretofore necessary, with the possibility of recovering the spent sulfuric acid as a by-product. And furthermore with the use of ozone for an oxidizing agent none of any foreign elements will enter the material under treatment, as will be the case if nitrate of sodium or potassium or permanganate of potassium has been or is used as an oxidizing agent for the precipitation of the iron content in aluminum sulfate solutions as usually practised. And consequently I produce a purer aluminum sulfate, and in turn a purer aluminum indirectly from silicates, etc., at a very low cost and a comparatively small investment. But this purification of the sulfate solution by ozone or ozonized air may be omitted in case the ferrous sulfate in the sulfate of aluminum, when marketed, is not objectionable, or the aluminous material under treatment is free of iron. Instead of moistening the powdered aluminous material, steam, watery vapors or a water spray may be brought in contact with the reagent gases to furnish the necessary moisture, so that the reaction between the sulfurous anhydrid and ozonized air can take place, and therefore moist air will have the same effect and may also be used by me.

Although I prefer to use the above described arrangement of containers for my operations, I do not confine myself to their exclusive use as any other mechanical device therefor suitable, such as for instance a rotating barrel, as generally used in chlorinating precious metal ores, may be used by me. And it should be understood from the foregoing that the sulfurous acid vapors produced in this process as an intermediary may be transformed into sulfuric acid without coming in contact with the aluminous materials when entering the acid-tower and passing over the multitude of moist surfaces of its pebble or coke content, which acts then upon the mixture of sulfurous anhydrid and ozone or ozonized air in the same way as the moist aluminous material and the resultant sulfuric acid is recovered as a by-product, which, however, will take place only on reloading of the container or from incidentally escaping sulfurous acid vapors during operation, and is not herein claimed, neither the production of sulfuric acid by electrical means.

I claim:—

1. The manufacture of aluminum sulfate which consists in the treating of aluminous materials with a combination of sulfurous anhydrid and ozonized oxygen in the presence of moisture, thus transforming the aluminum content of such material into a sulfate, substantially as described.

2. The manufacture of aluminum sulfate which consists in the treating of aluminous materials with a combination of sulfurous anhydrid and ozonized air in the presence of moisture, thus transforming the aluminum content of such materials into a sulfate, substantially as described.

3. The method of preparing aluminum sulfate, which consists in treating sufficiently wet aluminous materials with sulfurous anhydrid and ozone or ozonized air, thus transforming the aluminum content of those materials into a sulfate and the iron content of such materials into a basic ferric salt, then lixiviating the resultant mass with water, and then separating the dissolved aluminum sulfate, the basic ferric salt with other insoluble ingredients contained in the aluminous materials remaining as a residue, thus producing a pure aluminum sulfate.

4. The herein-described method of preparing aluminum sulfate, which consists in treating sufficiently wet aluminous materials with sulfurous acid gas and ozone or ozonized air, thus transforming the aluminum and iron content of said materials into sulfate and basic sulfate respectively, then lixiviating the resultant mass with water, then injecting into the resultant solution ozone or ozonized air sufficiently to transform the last traces of iron sulfate contained in the solution into a basic ferric salt, and then separating the solution of aluminum sulfate from the insoluble matter.

HEINRICH F. D. SCHWAHN.

Witnesses:
IRENE M. BOHANNON,
CHAS. McCLUSKEY.